United States Patent [19]
Byles

[11] 3,942,501
[45] Mar. 9, 1976

[54] TIMING CIRCUIT FOR FLYWHEEL IGNITION SYSTEM

[75] Inventor: Theodore A. Byles, Villa Park, Ill.

[73] Assignee: Motorola, Inc., Chicago, Ill.

[22] Filed: Nov. 14, 1974

[21] Appl. No.: 523,957

[52] U.S. Cl. ..... 123/148 CC; 123/149 D; 310/70 R; 310/153
[51] Int. Cl.² ........................................ H02K 21/22
[58] Field of Search .. 123/148 AC, 148 MC, 149 R, 123/149 C, 149 F, 149 D; 315/218; 310/70, 153, 156

[56] References Cited
UNITED STATES PATENTS

| | | | |
|---|---|---|---|
| 3,500,809 | 3/1970 | Hohne et al. | 123/148 MC |
| 3,746,901 | 7/1973 | Haubner et al. | 310/70 |
| 3,747,582 | 7/1973 | Kato | 123/149 D |

Primary Examiner—Charles J. Myhre
Assistant Examiner—Paul Devinsky
Attorney, Agent, or Firm—James W. Gillman; Donald J. Lisa

[57] ABSTRACT

A flywheel alternator for use with an electronic ignition system of an internal combustion engine. The flywheel has a rotor with an odd number of circumferentially located permanent magnets each of substantially the same size and shape. The radially inward pole faces of adjoining pairs of the magnets are of opposite polarity except for one pair which is of the same polarity. At least one stationary trigger coil is positioned to form magnetic circuits with the rotor magnets by bridging alternate ones of the magnets as the rotor rotates. A unique trigger pulse suitable for activating an electronic ignition system is generated only once each flywheel revolution. A stationary power coil has a length to bridge consecutive ones of the magnets to provide power to run other electrical appliances.

8 Claims, 1 Drawing Figure

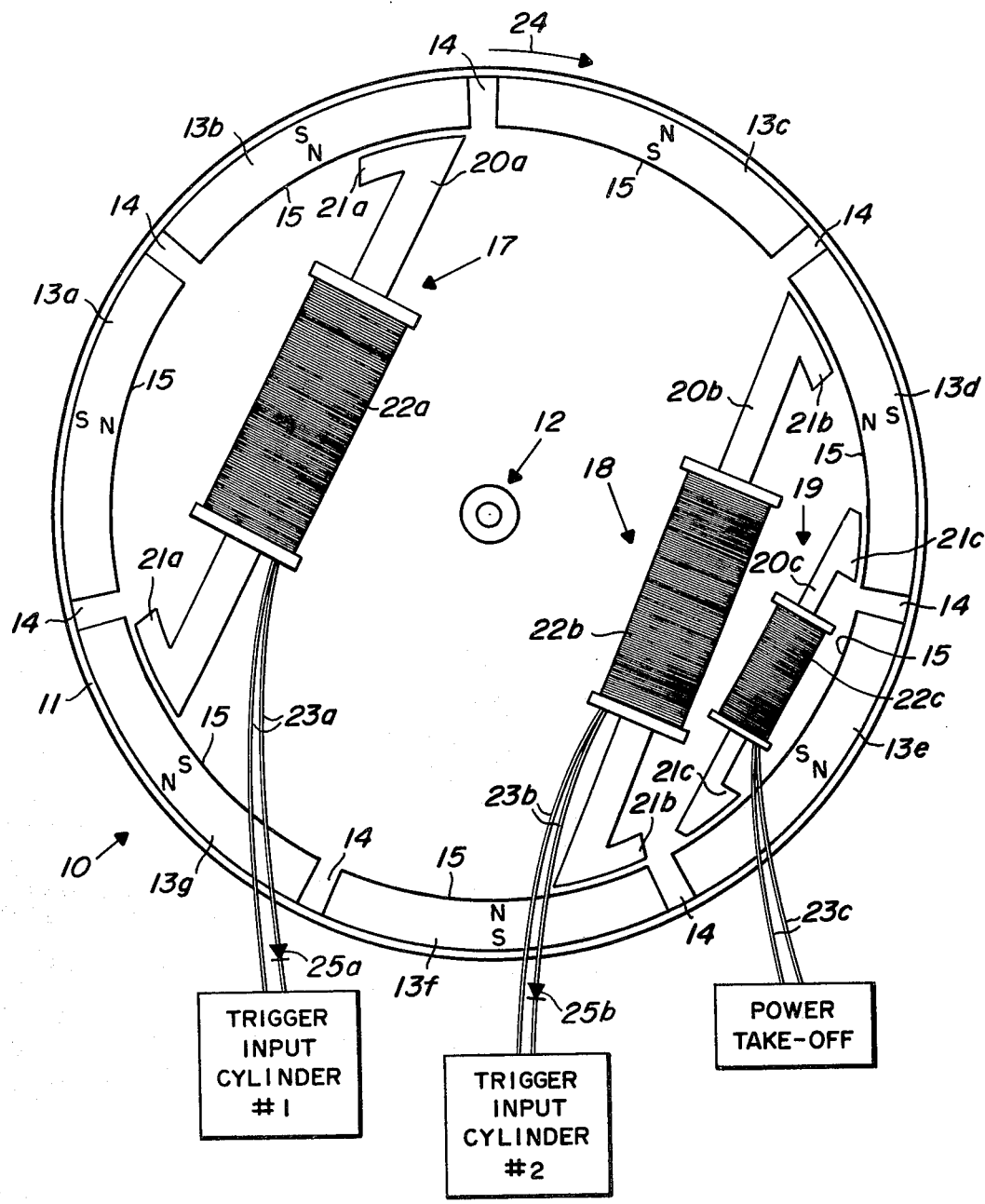

TIMING CIRCUIT FOR FLYWHEEL IGNITION SYSTEM

BACKGROUND OF THE INVENTION

This invention relates to flywheel alternators used in conjunction with electronic ignition systems in internal combustion engines.

Basically, the alternator's function is to transform mechanical motion of the engine into electrical power. In the past, generated electricity was used solely to charge the ignition coil and activate electrical appliances. With the advent of spark ignited electronic ignition systems, a means was sought to modify the basic alternator so that it would generate a suitable ignition trigger pulse as well as perofrm its previous function. Proper engine performance requires a non-ambiguous uniquely defined pulse. In 2-stroke-cycle, 2 cylinder engines, for example, a precise firing pulse for each cylinder is required exactly once per engine revolution.

Conventional alternators, such as shown in U.S. Pat. No. 3,741,186, cause a voltage to be induced across a coil of conductive wire which is stationed in a rotating magnetic field. The field is produced within a cup shaped rotor which has permanent magnets circumferentially located in its inner diameter. The magnets have one of their two poles facing the rotor's center. Adjoining magnets have opposite polarity poles so oriented. The rotor is mechanically coupled to the engine and, when rotated, creates a time varying magnetic field within the rotor's diameter.

A cylindrical coil of conductive wire is stationed within the rotor in such a manner that the pole faces of the magnets form magnetic circuits with the poles of the coil. An alternating voltage is created across the coil as it is sequentially coupled to opposite magnetic fields. External circuitry rectifies the alternating voltage making it suitable for powering the ignition coil and other automotive appliances.

One method of modifying the conventional alternator to generate a trigger pulse is disclosed in U.S. Pat. No. 3,746,901 entitled "Magneto Generator For Ignition Systems of Internal Combustion Engines" issued on July 17, 1973. According to the invention, a reversely polarized control magnet is located within a main magnet. Pole shoes of a pulse generator winding are stationed to form a magnetic circuit when opposite the main magnet having the inner control magnet. At this time, a pulse is generated. An obvious disadvantage of this approach is that a special main and control magnet must be manufactured distinctly from the other main magnets.

S.A.E. paper 680579 published by T. Frazer Charmichael discloses a trigger circuit in which the south oriented main magnet of a conventional generator is replaced with a north oriented magnet. This results in three adjoining north polarity main magnets. Two trigger coils are positioned on adjacent salient poles. As the trigger coils are wired in opposition, there will be no net voltage developed across them until each is opposite the same polarity magnetic pole. However, since there are three adjacent north oriented poles, this system will produce two pulses per revolution. This may result in engine misfiring.

Accordingly it is an object of this invention to provide a new and improved flywheel alternator for use with a pulse triggered ignition system which produces a single trigger pulse suitable for triggering an electronic ignition system each engine revolution.

It is another object of the invention to provide a flywheel alternator of the type described in the previous paragraph having a single trigger coil.

It is a further object of the invention to provide a flywheel alternator as above-described which uses main magnets all of which have similar manufacture.

SUMMARY OF THE INVENTION

The flywheel alternator of the invention uses a rotor having an odd number of permanent magnets all of substantially the same size and shape. Pairs of adjoining magnets have opposite orientation except for two which are of the same magnetic orientation. A stationary trigger coil has a length relative to the permanent magnets to bridge two of the magnets each of which adjoins a common third one of the magnets. Due to the geometry and the location of the rotor magnets and trigger coil, a pulse suitable for firing an electronic ignition system is created only once per flywheel revolution.

The structure and operation of the invention will be better understood with reference to the drawings and detailed description which follows.

BRIEF DESCRIPTION OF THE DRAWING

FIG. 1 shows a flywheel alternator comprised of a cup shaped rotor, seven rotor permanent magnets, a trigger coil for each cylinder of a two cylinder engine, and a power coil. Also shown are appropriate connections to the trigger input of a conventional electronic ignition system and an electric power take off for charging the ignition coil and activating electrical appliances.

DETAILED DESCRIPTION OF THE PREFERRED EMBODIMENT

In the example illustrated in the drawing, a 2 cylinder, 2-stroke-cycle internal combustion engine has ignition and appliance power as well as trigger pulses for a conventional electronic ignition system taken off the flywheel alternator shown at 10. A cup shaped rotor 11 rotates about a hub 12 and is directly driven off of engine drive shaft (not shown). Symmetrically located on the rotor's inner circumference are seen radially polarized magnets 13 having inward pole faces 15 and separated by air gaps 14. Adjoining magnets 13 are alternately reverse polarized except for two 13a, 13b, which are of the same radial polarity.

Fixedly mounted on a stationary plate (not shown) are trigger coils 17, 18, and power coil 19. Each coil 17, 18, 19 is comprised of an armature plate 20a,b,c having pole shoes 21a,b,c. Wound on armature plates 20a,b,c are windings 22a,b,c which are continuous lengths of a conductive wire wound to form a cylindrical coil whose longitudinal axis is parallel to the longitudinal axis of the armature plates 20a,b,c. The first trigger coil 17 is stationed with respect to the inward faces 15 of the magnets 13b and 13g such that the pole shoes 21a of its predetermined length armature plate 20a bridge two rotor magnets 13b and 13g each of which adjoins a common third magnet 13a. The second trigger coil 18 is the same size and shape of the first trigger coil 17 and is mounted equidistant from the hub 12 as is coil 17 and on the opposite side of rotor 11 from coil 17 such that the longitudinal axis of trigger coils 17 and 18 are parallel.

Power coil 19 is mounted such the the pole shoes 21c of its suitably long armature plate 20c bridge two adjoining magnets 13d and 13e. All armature plates 20a,b,c are of a permeable material such as iron and all pole shoes 12a,b,c are shaped to conform to the inward faces 15 leaving a small air gap between face 15 and shoe 21.

The extreme ends of winding 22a of the first trigger coil are coupled through wires 23a and series diode 25a to the trigger input of the electronic ignition for cylinder no. 1.

The extreme ends of winding 22b of the second trigger coil are coupled through wires 23b and series diode 25b to the trigger input of the electronic ignition for cylinder no. 2.

The extreme ends of the windings 22c on the power coil 19 are coupled through wires 23c to be rectified, regulated and distributed to charge the ignition coil and activate electrical appliances by the power take off circuitry.

In operation, the engine turns the drive shaft which in turn rotates the rotor 11 in the clockwise direction as indicated by the arrow 24. Magnetic circuits can be seen to form from a rotor magnet 13 to the pole shoe 21 through the armature plate 20 to the opposite pole shoe 21 and its adjacent rotor magnet 13. If a coil's 17, 18 or 19 pole shoes 21a,b,c are opposite rotor magnet faces 15 of the same magnetic polarity there will be no net flux through the associated armature plate 20a,b,c. When poles faces 15 of opposite polarity are bridged by an armature plate 20a,b,c a net flux will be present in the armature plates 20a,b,c which will induce a voltage across the windings 22a,b, or c of the coils 17, 18 or 19.

The invention can be understood by analyzing the sequence of magnetic circuits formed at each of the coils 17, 18 and 19 during one rotor 11 revolution.

As can be seen from the drawings, the sequence of rotor magnets 13 bridged by the armature plate 20a of the first trigger coil 17 in the course of one rotor revolution is:
(13g) South — North (13b)
(13f) North (13a)
(13e) South — South (13g)
(13d) North — North (13f)
(13c) South — South (13e)
(13b) North — North (13d)
(13a) North — South (13c)

From the previous discussion, the winding 22a of the first trigger coil 17 will have an induced voltage only during the North-South and South-North orientations. As the direction of flux through the armature plate 20a in the North-South orientation is opposite that of the South-North orientation a voltage of opposite polarity will be induced on winding 22a. When the pulses of opposite polarity are coupled, via hook-up wires 23a, to the trigger input of the electronic ignition for cylinder no. 1, the trigger can be designed to fire on either polarity by blocking the undesired pulse with a conventional diode 25a or the like. If, for example, the diode blocks the pulse created during the South-North orientation, the trigger circuit will receive a pulse suitable from a North-South orientation for firing an electronic ignition system only once per flywheel revolution, as was a stated object of the invention.

The sequence of orientations of rotor magnets 13 opposite the pole shoes 21b of the second trigger coil 18 as the rotor 11 makes one revolution is seen to be:
(13d) North — North (13f)
(13c) South — South (13e)
(13b) North — North (13d)
(13a) North — South (13c)
(13g) South — North (13b)
(13f) North — North (13a)
(13e) South — South (13g)

If, as described above, the trigger circuit of the electronic ignition for cylinder no. 2 is designed to trigger only upon a North-South orientation, as per diode 25b, it is seen that the trigger circuit for cylinder no. 2 will fire one half rotor 11 revolution after cylinder no. 1. This fires the second cylinder at the proper time with respect to the first.

The sequence of orientations at the pole shoes 21c of power coil 19 during the course of one rotor 11 revolution is seen to be:
(13d) North — South (13e)
(13c) South — North (13d)
(13b) North — South (13c)
(13a) North — North (13b)
(13g) South — North (13a)
(13f) North — South (13g)
(13e) South — North (13f)

As six of the seven magnetic circuits formed each revolution in the power coil 19 are of opposite polarity, a substantial alternating voltage is developed across power winding 22c which when coupled through wires 23c to the power take off circuitry, is available as power to charge the ignition coil and activate electrical appliances.

While a preferred embodiment has been described, it will be understood that variations and modifications of this invention may be effected without departing from the spirit and scope of the invention as defined in the appended claims.

I claim:

1. An arrangement in a flywheel alternator for use with an electronic ignition system of an internal combustion engine having:
   a rotor provided with a plurality of circumferentially located radially polarized permanent magnets;
   at least one stationary power coil oriented in magnetic circuit relationship to the rotor magnets;
   at least one stationary trigger coil oriented in magnetic circuit relationship to the rotor magnets; and
   means for electrically coupling the coils to an electronic ignition system
   wherein the improvement comprises
   the rotor having an odd number of magnets with an adjoining pair of the magnets of the same radial polarity, the remaining adjoining pairs of the magnets of opposite polarity, the trigger coil having a dimension with respect to the permanent magnets to bridge two of the magnets each of which adjoins a common third one of the magnets, the power coil having a dimension with respect to the magnets to bridge magnets having a North-South or South-North orientation of their radially inward pole faces a number of times equal to one less than the total number of magnets,
   whereby in the sequence of magnetic circuits formed by the magnets bridging the trigger coil a unique pulse suitable for firing an electronic ignition system is generated exactly once each flywheel revolution and in the sequence of magnetic circuits formed by the magnets bridging the power coil substantial power is generated.

2. The arrangement of claim 1 wherein each of the magnets has substantially the same size and shape.

3. The arrangement of claim 1 in which there are at least five rotor permanent magnets.

4. The arrangement of claim 1 in which there are seven rotor permanent magnets.

5. The arrangement of claim 1 wherein the magnetic orientation of the radially inward pole faces of the pairs of magnets sequentially bridged by the trigger coil is North-South once during one revolution and South-North once during one revolution, a trigger pulse of one polarity being generated during one of the orientations and a trigger pulse of opposite polarity being generated during the other of the orientations, further comprisng means for blocking the trigger pulse created during one of the orientations, the other of the trigger pulses being useable for firing an electronic ignition system.

6. The arrangement of claim 4 in which the power coil has a dimension with respect to the magnets to bridge an adjoining pair of the magnets having a North-South or South-North orientation of their radially inward pole faces six times per flywheel revolution.

7. The arrangement of claim 1 wherein two stationary trigger coils are stationed one half flywheel revolution apart, each trigger coil creating a single pulse per revolution suitable for firing an electronic ignition system, one pulse occurring 180° of a flywheel revolution with respect to the second pulse.

8. The arrangement of claim 1 wherein the trigger and power coils are each comprised of an armature plate made of a permeable material and having pole shoes formed thereon, the pole shoes designed to conform the magnets face leaving a small air gap therebetween, and a winding thereon formed of a continuous length of conductive wire wound to form a cylindrical coil the longitudinal axis of which is substantially parallel to the longitudinal axis of the armature plate.

* * * * *